United States Patent [19]

Lokai et al.

[11] Patent Number: 4,905,243

[45] Date of Patent: Feb. 27, 1990

[54] METHOD AND APPARATUS FOR STABILIZING THE FREQUENCY OF A LASER BEAM

[75] Inventors: Peter Lokai, Bovenden; Heribert Rosenkranz, Göttingen, both of Fed. Rep. of Germany

[73] Assignee: Lambda Physik Forschungs-Und Entwicklungs-GmbH, Gott Ingen, Fed. Rep. of Germany

[21] Appl. No.: 288,428

[22] Filed: Dec. 22, 1988

[30] Foreign Application Priority Data

Dec. 28, 1987 [DE] Fed. Rep. of Germany ....... 3744323

[51] Int. Cl.⁴ ............................................... H01S 3/13
[52] U.S. Cl. ..................................... 372/32; 372/102; 372/28; 372/38
[58] Field of Search ...................... 372/29, 26, 38, 32, 372/28, 102

[56] References Cited

U.S. PATENT DOCUMENTS

| | | | |
|---|---|---|---|
| 4,309,671 | 1/1982 | Malyon | 372/32 |
| 4,331,937 | 5/1982 | Brown et al. | 372/57 |
| 4,348,647 | 9/1982 | Nigham et al. | 372/57 |
| 4,435,808 | 3/1984 | Javan | 372/29 |
| 4,468,773 | 8/1984 | Seaton | 372/28 |
| 4,513,422 | 4/1985 | Buholz | 372/29 |
| 4,558,952 | 12/1985 | Kulesh et al. | 356/351 |
| 4,592,043 | 5/1986 | Williams | 350/96.16 |

OTHER PUBLICATIONS

Babin et al., *Optics Letters* (1987) 12(7) :468–471.
Demtroder, "Fundamentals and Techniques of Laser Spectroscopy", Spring Publishers, 1977, pp. 71–72, 108, 113–119.
Dovichi et al., *Appl. Optics* (1982) 21(8): 1468–1473.

*Primary Examiner*—Léon Scott, Jr.
*Attorney, Agent, or Firm*—Irell & Manella

[57] ABSTRACT

For stabilizing the frequency of a narrow-band Excimer laser beam the interference rings of a Fabry-Perot interferometer 16 are projected onto a solid-state image sensor 18 and by means of the solid-state image sensor an electrical signal is generated which is dependent on the frequency of the laser beam. The electrical signal is compared with a stored reference signal to derive an adjusting signal 32 for an optical reflection grating 38 with which the frequency of the laser beam 12 is regulated to a desired value. The absolute value of the frequency of the laser beam 12 is determined by means of the optogalvanic effect.

11 Claims, 3 Drawing Sheets

METHOD AND APPARATUS FOR STABILIZING THE FREQUENCY OF A LASER BEAM

The invention relates to a method and an apparatus for stabilizing the frequency of a laser beam, in particular of an Excimer laser, comprising an adjustable wavelength-selective element, such as an optical grating, with which the frequency of the laser beam is variable, and a spectral apparatus, such as a Fabry-Perot interferometer, into which a part of the laser beam is introduced to derive an adjusting signal for adjustment of the wavelength-selective element.

The laser is becoming to an increasing extent an instrument for working materials. In the range of short wavelengths the Excimer laser emitting pulsed UV radiation is becoming of increasing importance.

In a great number of laser uses a stable (i.e. constant) frequency of the laser beam is required. If for example Excimer lasers are to be used in a photolithographic method for making integrated circuits they must be operated with narrow band of stable frequency because the necessary optical system is not achromatic. The frequency width should be at the most 0.5 cm$^{-1}$ compared with about 50 cm$^{-1}$ in normal operation of an Excimer laser.

Methods for reducing bandwidths, in particular in an Excimer laser, are known. For example, the bandwidth of the laser beam can be narrowed by using a refection grating in the so-called Littrow array. The reflection grating serves as wavelength-selective element which is adjustable for changing the frequency of the laser beam. Prism arrangements are also known for wavelength selection and adjustment (W. Demtröder, "Fundamentals and techniques of laser spectroscopy", Spring Publications, 1977, p. 108).

In the present invention the methods for wavelength selection and bandwidth narrowing of the laser beam referred to above are presumed known and employed.

The frequency of a beam emitted by a laser can for example fluctuate due to mechanical or thermal effects. A distinction is made between long-time fluctuations and short-time fluctuations. Methods are also known of counteracting such fluctuations and stabilizing the beam frequency (see for example "Fundamentals and techniques of laser spectroscopy", Springer Publications, 1977, p. 113 to 119). Here, inter alia spectral apparatuses are used, such as Fabry-Perot interferometers, the function of which is likewise presumed known for the understanding of the invention.

With lasers operated in a narrow band it is not only desirable to keep the frequency stable. In addition, for a great number of uses it is desirable to know exactly the absolute value of the stable frequency of the laser beam. For determining the absolute wavelength of a laser beam inter alia utilization of the so-called optogalvanic effect is already known (cf. for example F. Babin, P. Camus, J. N. Gagné P. Pillet and J. Boulmer in "OPTICS LETTER", Vol. 12, July 1987, p. 486–470; and N. J. Dovichi, D. S. Moore and R. A. Keller in "APPLIED OPTICS", Vol. 21, 1982, p. 1468–1473).

The optogalvanic effect was initially employed in the visible and IR range of the electromagnetic spectrum. For this purpose a glow lamp or standard hollow cathode lamp is used and illuminated with a partial beam coupled out of the laser beam. The wavelength of the laser is then varied by means of the aforementioned wavelength-selective element and the impedance of the lamp measured in dependence upon the wavelength. In this manner the so-called optogalvanic spectrum is obtained. If the laser wavelength corresponds to an energetic transition in the lamp (corresponding either to the spectrum of the cathode material or of a buffer gas contained in the lamp) the impedance changes considerably. On such an impedance change the laser wavelength set corresponds to the known tabulated value of the spectral transition in the lamp. The optogalvanic effect permits a very great accuracy in the determination of the wavelength. With wavelengths below 300 nm the optogalvanic effect is concealed in standard hollow cathode lamps by the photoeffect. At these wavelengths the photon energies exceed the electron work function so that it is hardly possible to measure optogalvanic effects. In the aforementioned publication of F. Babin et al. a special hollow cathode arrangement is suggested (so-called "see-through" array) with which UV laser beams can also be measured because the photoeffect is suppressed.

The tuning range of a narrow-band KrF Excimer laser lies in the wavelength range of 248 to 249 nm. As optogalvanic calibration standard for determining the laser wavelength the iron I spectrum is particularly suitable (see "HANDBOOK OF CHEMISTRY AND PHYSICS", 67th Edition (1986/87), CRC. Press).

Proceeding from this prior art the problem underlying the invention is to provide a simple uninvolved measurement-accurate method for stabilizing the frequency of a laser beam, in particular an Excimer laser. In addition, it is also to be possible to measure accurately the absolute value of the stabilized frequency and the frequency is to be adjustable to a desired predetermined value.

According to the invention this problem is solved in that by means of the spectral apparatus an image, dependent on the frequency of the laser beam, such as a Fabry-Perot ring system is imaged on a solid-state image sensor, that by means of the solid-state image sensor an electrical signal dependent on the frequency of the laser beam is generated, that the electrical signal is compared with a stored reference signal and that from the comparison result the adjusting signal for the wavelength-selective element is derived.

A spectral apparatus means an apparatus which images an electromagnetic beam in dependence upon the wavelength. Known apparatuses of this type include essentially prism spectrographs, grating spectrographs and interference spectroscopes. So-called Fabry-Perot etalons have proved to be particularly suitable for the present invention, generating a concentric ring system in which the ring diameter depends on the wavelength of the light imaged (cf. W. Demtröder, loc. cit., p. 71, 72).

Thus, according to the invention the wavelength-dependent (it is obvious here that in this connection the wavelength is taken as equivalent to the frequency, being of course linked to the latter via the velocity of light) image generated by the spectral apparatus is imaged on a solid-state picture or image sensor.

Various types of solid-state picture or image sensors are known, for example so-called diode arrays, CCDs and semiconductor sensors with static induction transistors. With such solid-state picture sensors a picture imaged on the reception surface of the image sensor can be converted directly to a corresponding electrical signal which contains all information of the image, i.e.

in particular its structure, position of intensity maxima, etc.

In a preferred embodiment of the method according to the invention it is provided that the electrical output signal of the solid-state image sensor is subjected to a pattern analysis in which the position of the intensity maxima of the image is determined. The position of the intensity maxima actually determined is compared with desired positions with regard to the intensity maxima previously stored as reference signal and in accordance with the deviation of the position of the actual (instantaneous) intensity maxima from the desired position an adjusting signal is derived for the wavelength-selective element of the laser so that the wavelength-selective element is adjusted in such a manner that the frequency of the laser beam is changed so that the position of the intensity maxima again corresponds to its desired position.

According to a further development of the invention the reference signal which as described above represents the desired positions of the intensity maxima can be obtained in that by means of the optogalvanic effect described above the laser is tuned by means of the wavelength-selective element so that the frequency of the laser beam corresponds to a maximum of the optogalvanic spectrum so that the wavelength is exactly known, whereupon the electrical signal generated at said wavelength by the solid-state image sensor is stored in a memory and is used for subsequent operation of the laser as reference signal so that on a possible drift of the beam frequency the laser is then regulated to the known wavelength.

Apparatuses for carrying out the methods described above are described in claims 5 and 6.

The determination of the absolute value of the beam frequency according to the invention by means of the optogalvanic effect using an iron cathode not contacted by the beam may also be used independently of the frequency stabilization.

Hereinafter an example of embodiment of the invention will be explained in detail with the aid of the drawings, wherein.

Figure 1:
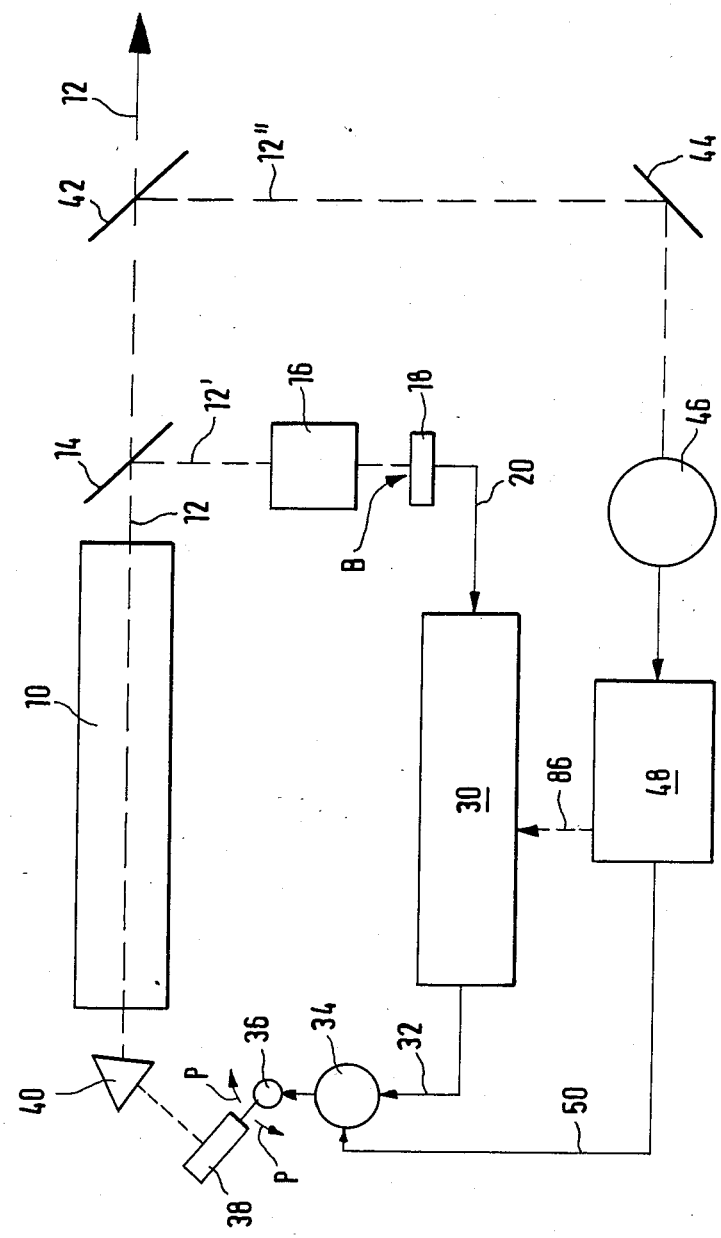
FIG. 1 shows schematically an arrangement for stabilizing the frequency of an Excimer laser beam including an arrangement for determining the absolute value of the beam frequency.
Figure 4:
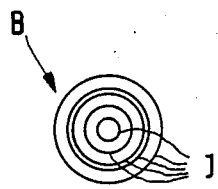
FIG. 4 shows schematically the image generated by a Fabry-Perot interferometer.

In the example of embodiment shown in FIG. 1 a pulsed Excimer laser 10 is operated for example with KrF. The coupling-out side of the Excimer laser 10 lies in FIG. 1 on the right. The emitted laser beam 12 thus has wavelengths in the range from 248 to 249 nm. By means of a coupling-out mirror 14 a small proportion of the laser beam 12 is coupled out in the form of the partial beam 12' and directed onto a Fabry-Perot interferometer 16. The Fabry-Perot interferometer 16 generates an image B in the form of concentric rings of intensity maxima I (see FIG. 4). The Excimer laser 10 is driven with a narrow band in a manner known per se, for which purpose an optical reflection grating to be described below is used.

The image B generated by the Fabry-Perot interferometer 16 is directed onto a solid-state image sensor 18 which as such is likewise known and converts the image B to an equivalent electrical signal 20. The electrical signal 20 furnished by the solid-state image sensor 18 thus contains a clear association between the information content of the image B and in particular the position of the intensity maxima I (see FIG. 4) and the individual components of the electrical signal 20 which is introduced into a control and comparison circuit 30 for the frequency stabilization which will be described below in detail with the aid of FIG. 2.

In the control and comparison circuit 30 the electrical output signal 20, corresponding to the image B, of the solidstate image sensor 18 is compared with a previously stored reference signal (which will be described in detail below). As already stated above the position of the intensity maxima of the image B and thus also the electrical signal 20 furnished by the solid-state image sensor 18 depends on the wavelength of the laser beam 12. The reference signal stored in the control and comparison circuit 30 corresponds to a desired frequency($\doteq$ wavelength) of the laser beam 12. If the electrical signal 20 derived by the solid-state image sensor 18 from the image B is equal to the reference signal stored in the control and comparison circuit 30 the wavelength of the laser need not be changed.

If however (in the manner to be described in detail below) the control and comparison circuit determines a deviation between the momentarily measured electrical signal and the stored reference signal a corresponding adjusting signal 32 is derived from the deviation and sent by the control and comparison circuit 30 to an adjusting motor 34. Via a rotary joint 36 the adjusting motor 34 acts on an optical reflection grating 38 which is moved in the direction of the arrows P depending on the magnitude and direction of the adjusting signal 32 to change the frequency (wavelength) of the laser beam 12. The optical reflection grating 38 forms with a beam widener 40 part of the laser resonator and serves both to narrow the bandwidth to a value of about 0.5 cm$^{-1}$ as well as to change the frequency of the laser beam.

According to FIG. 1 in the laser beam 12 a further coupling-out mirror 42 is disposed which likewise cuts out a weak partial beam 12" from the laser beam 12. Via a mirror 44 the partial beam 12" is directed onto a hollow cathode lamp 46. The partial beam 12' passes through the hollow cathode lamp and generates there the optogalvanic effect described above. By means of a circuit 48 an optogalvanic spectrum is generated as will be described in detail below with refer to FIG. 3. The circuit 48 for determining an optogalvanic spectrum also generates an adjusting signal 50 with which independently of the adjusting signal 52 described above the adjusting motor 34 for the optical reflection grating 38 is likewise controllable. To register an optogalvanic spectrum (i.e. the dependence of the impedance of the hollow cathode lamp 46 on the wavelength of the laser beam 12) a continuously varying adjusting signal 50 is generated by the circuit 48 so that the frequency of the laser beam 12 is continuously changed by means of the optical reflection grating 38. If in the optogalvanic spectrum the impedance reaches an intensity maximum (peak) then an exact wavelength can be associated with said peak on the basis of the known spectrum of the hollow cathode lamp 46 and the optical reflection grating 38 is held at said point.

At the same time the Fabry-Perot etalon 16 produces an image B on the solid-state image sensor 18 corresponding to this known wavelength of the laser beam 12. The electrical output signal 20 of the solid-state image sensor 18 corresponding to said specific image B is entered into the control and comparison circuit 30 and there stored as reference signal.

If for example by thermal effects or mechanical oscillations the frequency of the laser beam 12 varies then the image B generated by the Fabry-Perot etalon 16 also changes and correspondingly also the output signal 20 of the solid-state image sensor 18. This is determined in the comparison with the previously stored reference signal carried out in the control and comparison circuit 30 and the adjusting signal 32 is derived correspondingly in order via the adjusting motor 34 to adjust the optical reflection grating 38 in the sense of one of the arrows P so that the frequency of the laser beam 12 is changed in such a manner that it again corresponds to the absolute value previously determined by means of the optogalvanic effect.

Figure 2:
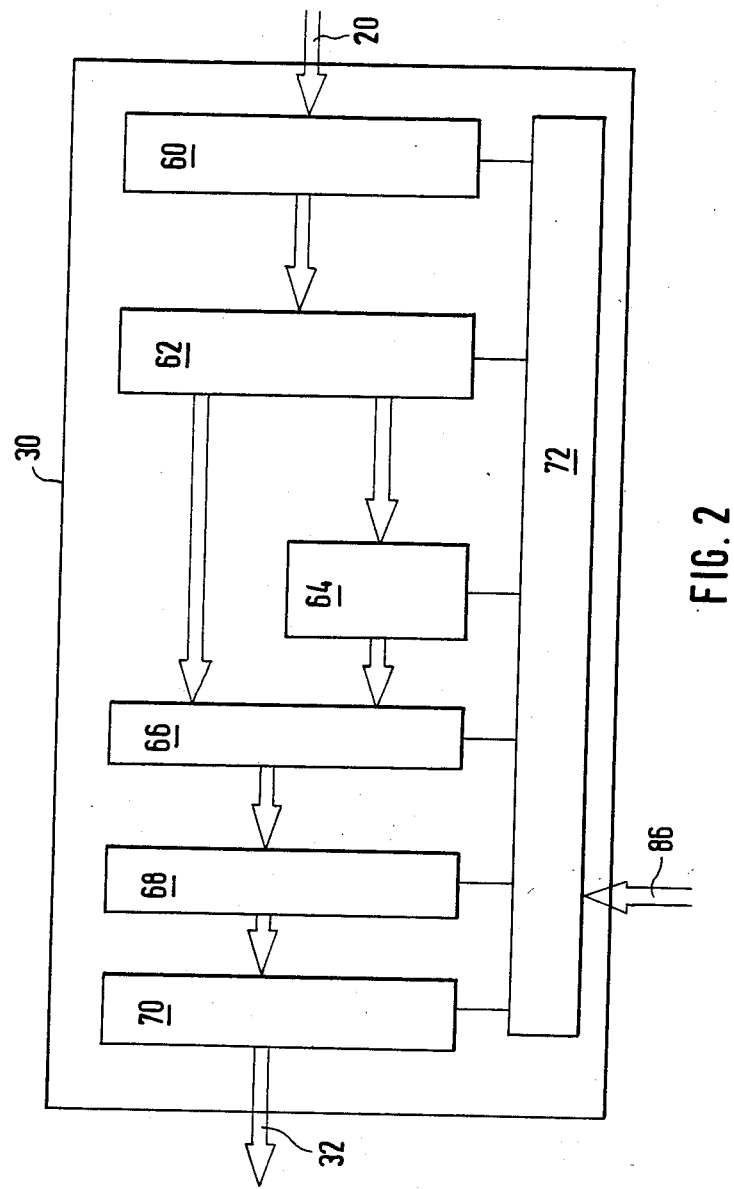
FIG. 2 is a block diagram of the control circuit for the frequency stabilization.

FIG. 2 shows details of the control and comparison circuit 30 for the frequency stabilization of the laser beam 12.

The output signal 20 of the solid-state image sensor 18 is entered into a filter 60. In the filter 60 the arithmetic mean can be formed over a predefinable number of laser pulses. The number of pulses for forming a mean can be set between 1 and 256.

The output signal of the filter 60 is entered into a pattern identification circuit 62. In the pattern identification circuit 62 the intensity maxima of the Fabry-Perot rings (see FIG. 4) are analyzed with regard to their wavelength-dependent position and their magnitude. For this purpose it is determined how the intensity maxima (peaks) are locally distributed. Peaks are registered as such only if they exceed a minimum height, have a minimum width and lie completely, i.e. both with their rising and with their falling edge, in a predetermined interval. The pattern identification circuit 62 thus generates substantially an image of the Fabry-Perot pattern according to FIG. 4. The pattern of intensity maxima identified by the pattern identification circuit 62 is transferred to a memory 64 as the reference signal described above when a corresponding command is given to the pattern identification circuit 62 by a control 72. It is apparent from the foregoing that said command is generated when using the optogalvanic effect for absolute value determination of the frequency of the laser beam when in the optical spectrum an intensity maximum is reached of which the associated wavelength is exactly known and corresponds to the desired wavelength of the laser beam 12. The circuit 48 for determining an optogalvanic spectrum then emits a control signal 86 to the control circuit 72 (see FIGS. 1, 2 and 3) and at said wavelength the reference signal (which could also be referred to as reference pattern) is transferred from the pattern identification circuit 62 to the memory 64 for the reference signal and there stored. The reference signal stored in the memory 64 is used as calibration standard for the control of the beam frequency in the subsequent operation of the laser. For this purpose, in the subsequent operation of the laser both the reference signal permanently stored in the memory 64 and the actual intensity pattern determined by the pattern recognition or identification circuit 62 are entered into a comparator 66. It is obvious that the reference signal is not erased in the memory 64 on transfer to the comparator 66. In the comparator 66 the reference pattern serving as reference signal (and stored in the memory 64) is compared with the actual pattern of the image B determined by the pattern identification circuit 62 and the deviations are calculated.

A controller 68 derives from the calculated deviations an adjusting signal for the adjusting motor 34 and this signal is processed in a motor driver 70 in such a manner that the adjusting motor 34 can be directly driven.

The control circuit 72 controls and monitors the aforementioned sequences and at the same time provides an interface to the user via which for example data relating to the desired beam frequency can be entered.

Figure 3:
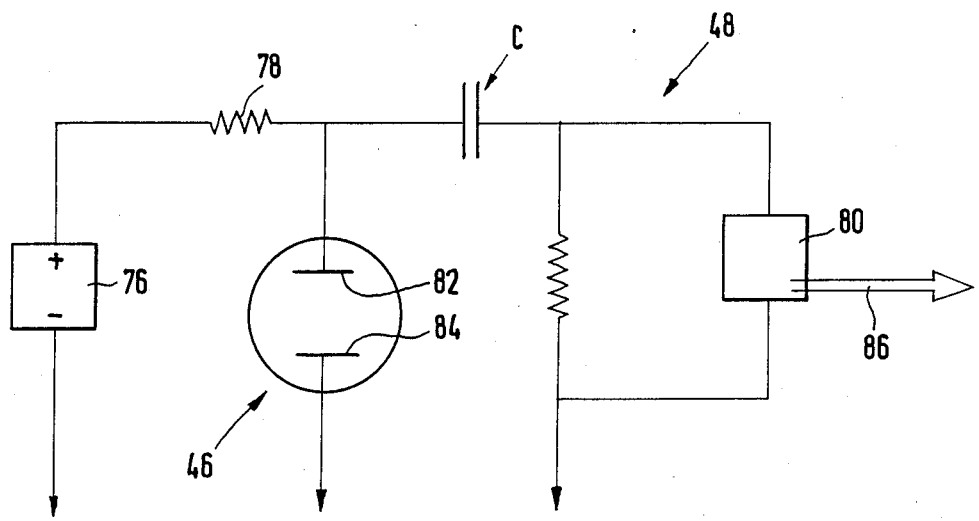
FIG. 3 is a circuit diagram for the measurement of the absolute value of the frequency using the optogalvanic effect.

FIG. 3 shows details of the hollow cathode lamp 46 and the circuit for determining an optogalvanic spectrum. The lamp 46 is supplied from a stabilized voltage source 76 with DC voltage of for example 400 volts. A dropping resistor 78 limits the current for example to 30 mA. The impedance change of the hollow cathode lamp 46 is coupled out via a capacitor C and the optogalvanic spectrum picked up by means of a pulse peak detector (boxcar). The electrodes of the hollow cathode lamp 46 are indicated by the reference numerals 82, 84. When the optogalvanic spectrum reaches a peak at a desired point of which an associated wavelength is known, a control signal 86 is derived and in the manner described above entered into the control circuit 72 to generate a calibration standard.

We claim:

1. A method of stabilizing the wavelength of a laser beam (12) emitted by an Excimer laser which includes a wavelength-selective means (38) for adjusting said wavelength, and a spectral apparatus (16) into which a part (12') of the laser beam is introduced to derive an adjusting signal for adjustment of the wavelength-selective means, including the steps of:

projecting an image (B) onto a solid-state image sensor, by means of the spectral apparatus (16), said image being dependent on the wavelength of the laser beam (12);

generating, by means of the solid-state image sensor (18), an electrical signal (20) dependent on the wavelength of the laser beam (12);

comparing the electrical signal (20) with a predetermined reference signal; and deriving from the comparing step an adjusting signal (32) for the wavelength-selective means (38).

2. A method according to claim 1, further including the step of:

after the generating step, analyzing the electrical output signal (20) of the solid-state image sensor (18) for determining positions of intensity maxima (I) of the image, wherein the comparison step includes the step of comparing the positions of the intensity maxima (I) with desired positions of the intensity maxima previously stored as the reference signal; and the deriving step includes the step of determining a deviation of the positions of the intensity maxima (I) from the desired positions thereof.

3. A method according to claim 2, wherein the reference signal is formed by averaging the electrical signal of the solid-state image sensor (18) over a predetermined number of laser pulses.

4. Method according to claim 2, characterized in that by means of an optogalvanic effect the absolute value of the wavelength of the laser beam (12) is measured and that to form the reference signal the electrical signal of the solid-state image sensor (18) is stored when the laser is set by means of the wavelength adjusting means (38) to a wavelength with known absolute value.

5. A method according to claim 1, wherein the reference signal is derived by averaging the electrical signal of the solid-state image sensor (18) over a predetermined number of laser pulses.

6. Method according to claim 5, characterized in that by means of an optogalvanic effect the absolute value of the wavelength of the laser beam (12) is measured and that to form the reference signal the electrical signal of the solid-state image sensor (18) is stored when the laser is set by means of the wavelength adjusting means (38) to a wavelength with known absolute value.

7. A method according to claim 1, including the step of measuring an absolute value of the wavelength of the laser beam (12), wherein to derive the reference signal the electrical signal of the solid state image sensor (10) is detected when the laser is set by means of the wavelength-selective means (38) to a wavelength with a known absolute value.

8. An apparatus for stabilizing the wavelength of a laser beam (12) emitted by an Excimer laser which includes wavelength-selective means (38) for adjusting the wavelength, comprising:
  a spectral apparatus (16) into which a part (12') of the laser beam is introduced to derive an adjusting signal for adjustment of the wavelength-selective means for generating an image (B) dependent on the wavelength of the laser beam (12);
  a solid-state image sensor on which the image (B) generated by the spectral apparatus (16) is imaged for generating an electrical signal (20) corresponding to said image; and
  a comparison circuit (66) coupled to said image sensor for comparing said electrical signal corresponding to said image (B) with a reference signal for generating an adjusting signal (32) for the wavelength-selective means (38).

9. An apparatus according to claim 8, further including:
  an optogalvanic hollow cathode lamp (46) coupled to a part (12") of the laser beam (12) which passes through an iron-containing hollow cathode (82) without striking the walls thereof;
  means (48) for measuring an optogalvanic spectrum generated by the partial laser beam (12") in dependence upon a position of the wavelength-selective means (38);
  a control circuit connected to said comparison circuit; and
  means for emitting a signal (86) to said control circuit when said optogalvanic spectrum reaches a peak corresponding to a known wavelength of an iron spectrum.

10. A method of stabilizing the wavelength of a laser beam (12) emitted by a laser which includes a wavelength-selective means (38) for adjusting said wavelength, and a spectral apparatus (16) such as a Fabry-Perot interferometer into which a part (12') of the laser beam is introduced to derive an adjusting signal for adjustment of the wavelength-selective means, including the steps of:
  projecting an image (B) onto a solid-state image sensor, by means of the spectral apparatus (16), said image being dependent on the wavelength of the laser beam (12);
  generating, by means of the solid-state image sensor (18), an electrical signal (20) dependent on the wavelength of the laser beam (12);
  comparing the electrical signal (20) with a predetermined reference signal; and
  deriving from the comparing step an adjusting signal (32) for the wavelength-selective means (38).

11. An apparatus for stabilizing the wavelength of a laser beam (12) emitted by a laser which includes wavelength-selective means (38) for adjusting the wavelength, comprising:
  a spectral apparatus (16), such as a Fabry-Perot interferometer, into which a part (12') of the laser beam is introduced to derive an adjusting signal for adjustment of the wavelength-selective means for generating an image (B) dependent on the wavelength of the laser beam (12);
  a solid-state image sensor on which the image (B) generated by the spectral apparatus (16) is imaged for generating an electrical signal (20) corresponding to said image; and
  a comparison circuit (66) coupled to said image sensor for comparing said electrical signal corresponding to said image (B) with a reference signal for generating an adjusting signal (32) for the wavelength-selective means (38).

* * * * *